United States Patent
Dix

(10) Patent No.: US 8,764,053 B1
(45) Date of Patent: Jul. 1, 2014

(54) AIRBAG ASSEMBLY

(71) Applicant: Nissan North America, Inc., Franklin, TN (US)

(72) Inventor: Jeffery Dix, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/778,638

(22) Filed: Feb. 27, 2013

(51) Int. Cl.
- *B60R 21/203* (2006.01)
- *B60R 21/213* (2011.01)
- *B60R 21/232* (2011.01)
- *B60R 21/233* (2006.01)

(52) U.S. Cl.
USPC .............. 280/730.1; 280/729; 280/730.2; 280/731; 280/743.1

(58) Field of Classification Search
USPC ......... 280/729, 730.1, 730.2, 731, 742, 743.1
See application file for complete search history.

(56) References Cited

U.S. PATENT DOCUMENTS

| | | | | |
|---|---|---|---|---|
| 2,834,606 A | * | 5/1958 | Bertrand | 280/730.1 |
| 3,510,150 A | * | 5/1970 | Wilfert | 280/733 |
| 3,664,682 A | * | 5/1972 | Wycech | 280/730.1 |
| 3,752,501 A | | 8/1973 | Daniel et al. | |
| 3,791,667 A | * | 2/1974 | Haviland | 280/730.2 |
| 3,897,961 A | * | 8/1975 | Leising et al. | 280/730.1 |
| 5,235,892 A | | 8/1993 | Terada et al. | |
| 5,333,899 A | * | 8/1994 | Witte | 280/730.2 |
| 5,452,915 A | | 9/1995 | Fredin | |
| 5,470,103 A | * | 11/1995 | Vaillancourt et al. | 280/730.1 |
| 5,486,019 A | * | 1/1996 | Chevroulet et al. | 280/730.1 |
| 5,575,497 A | * | 11/1996 | Suyama et al. | 280/730.1 |
| 5,863,068 A | * | 1/1999 | Breed | 280/743.1 |
| 6,179,326 B1 | * | 1/2001 | Breed et al. | 280/735 |
| 6,224,088 B1 | * | 5/2001 | Lohavanijaya | 280/728.2 |
| 6,431,586 B1 | * | 8/2002 | Eyrainer et al. | 280/730.1 |
| 6,722,691 B1 | * | 4/2004 | Håland et al. | 280/730.1 |
| 6,749,218 B2 | * | 6/2004 | Breed | 280/735 |
| 6,851,706 B2 | * | 2/2005 | Roberts et al. | 280/730.1 |
| 7,000,943 B2 | | 2/2006 | Hasebe et al. | |
| 7,029,030 B2 | * | 4/2006 | Amamori | 280/730.1 |
| 7,338,069 B2 | * | 3/2008 | Breed | 280/729 |

(Continued)

FOREIGN PATENT DOCUMENTS

| | | | | |
|---|---|---|---|---|
| EP | 1 541 426 A1 | | 6/2005 | |
| JP | 04110252 A | * | 4/1992 | B60R 21/22 |
| WO | 2012111073 | | 8/2012 | |

*Primary Examiner* — Ruth Ilan
*Assistant Examiner* — Laura Freedman
(74) *Attorney, Agent, or Firm* — Young, Basile, Hanlon & MacFarlane, P.C.

(57) ABSTRACT

A vehicle includes a driver airbag and a curtain airbag. The driver airbag has a primary driver airbag portion that defines an occupant-facing surface and a secondary driver airbag portion that, when inflated, extends outward from the occupant-facing surface of the primary driver airbag portion. The curtain airbag has a primary curtain portion that defines an occupant-facing surface and a secondary curtain portion that, when inflated, extends outward from the occupant-facing surface of the primary curtain portion, wherein the secondary driver airbag portion and the secondary curtain portion are positioned with respect to one another such that, when inflated, the secondary driver airbag portion and the secondary curtain portion are engageable with each other.

17 Claims, 5 Drawing Sheets

(56) References Cited

U.S. PATENT DOCUMENTS

| | | | |
|---|---|---|---|
| 7,513,524 B2 * | 4/2009 | Oota et al. | 280/733 |
| 7,758,067 B2 * | 7/2010 | Narin et al. | 280/730.1 |
| 7,762,579 B2 * | 7/2010 | Garner | 280/730.2 |
| 8,104,790 B2 * | 1/2012 | Nezaki | 280/733 |
| 8,297,648 B2 * | 10/2012 | Komoll et al. | 280/729 |
| 2005/0035577 A1 * | 2/2005 | Barko et al. | 280/730.2 |
| 2006/0097491 A1 | 5/2006 | Saberan et al. | |
| 2013/0270805 A1 | 10/2013 | Kruse et al. | |

\* cited by examiner

AIRBAG ASSEMBLY

TECHNICAL FIELD

The disclosure relates to the field of inflatable restraints for automobiles.

BACKGROUND

Inflatable restraint devices commonly called airbags are standard equipment on most new vehicles. In early implementations of airbag systems, vehicles were equipped with one or more airbags that would deploy from forward-facing regions such as the steering wheel and the passenger side of the instrument panel. In more recent implementations, additional airbags have been employed in different areas of the vehicle. For example, side-curtain airbags have been utilized to provide enhanced energy dissipation capacity along the sides of vehicles. Side-curtain airbags have been employed in areas adjacent to the roof rail and headliner or the side doors. These airbag devices are typically concealed from occupant view prior to deployment by interior trim panels associated with the roof rail and/or headliner.

When an airbag is deployed, it is inflated with a gas, which pressurizes the airbag and induces surface tension in the material from which the airbag is fabricated. To ensure that the airbag deploys correctly, guide features are sometimes provided to allow the tensioned material to move in a desired manner with respect to adjacent vehicle structures, such as trim panels, structural pillars, windows, and seats.

SUMMARY

Airbag assemblies for use in vehicles are taught herein.

One aspect of the disclosed embodiments is a vehicle that includes a driver airbag and a curtain airbag. The driver airbag has a primary driver airbag portion that defines an occupant-facing surface and a secondary driver airbag portion that, when inflated, extends outward from the occupant-facing surface of the primary driver airbag portion. The curtain airbag has a primary curtain portion that defines an occupant-facing surface and a secondary curtain portion that, when inflated, extends outward from the occupant-facing surface of the primary curtain portion, wherein the secondary driver airbag portion and the secondary curtain portion are positioned with respect to one another such that, when inflated, the secondary driver airbag portion and the secondary curtain portion are engageable with each other.

Another aspect of the disclosed embodiments is a vehicle that includes a driver airbag and a curtain airbag. The driver airbag has a primary driver airbag portion that defines an occupant-facing surface and a secondary driver airbag portion that, when inflated, extends outward from the occupant-facing surface of the primary driver airbag portion. The driver airbag includes a rear panel, a front panel, and a driver airbag extension panel. The rear panel and the front panel cooperate to define the primary driver airbag portion. The front panel and the driver airbag extension panel cooperate to define the secondary driver airbag portion. The front panel has at least one driver airbag communication aperture extending therethrough for fluid communication between the primary driver airbag portion and the secondary driver airbag portion. The curtain airbag has a primary curtain portion that defines an occupant-facing surface and a secondary curtain portion that, when inflated, extends outward from the occupant-facing surface of the primary curtain portion. The curtain airbag includes an exterior panel, an interior panel, and a curtain extension panel. The exterior panel and the interior panel cooperate to define the primary curtain portion, and the interior panel and the curtain extension panel cooperate to define the secondary curtain portion. The interior panel has at least one curtain airbag communication aperture extending therethrough for fluid communication between the primary curtain portion and the secondary curtain portion. The secondary driver airbag portion and the secondary curtain portion are positioned with respect to one another such that, when inflated, the secondary driver airbag portion and the secondary curtain portion are engageable with each other.

Another aspect of the disclosed embodiments is a vehicle that includes a vehicle body, a steering wheel connected to the vehicle body, a driver airbag connected to the steering wheel, a first inflator associated with the driver airbag for inflating the driver airbag, a curtain airbag connected to the vehicle body, and a second inflator associated with the curtain airbag for inflating the curtain airbag. The driver airbag has a primary driver airbag portion that defines an occupant-facing surface and a secondary driver airbag portion that, when inflated, extends outward from the occupant-facing surface of the primary driver airbag portion. The driver airbag includes a rear panel, a front panel, and a driver airbag extension panel. The rear panel and the front panel cooperate to define the primary driver airbag portion. The front panel and the driver airbag extension panel cooperate to define the secondary driver airbag portion. The front panel has at least one driver airbag communication aperture extending therethrough for fluid communication between the primary driver airbag portion and the secondary driver airbag portion. The curtain airbag has a primary curtain portion that defines an occupant-facing surface and a secondary curtain portion that, when inflated, extends outward from the occupant-facing surface of the primary curtain portion. The curtain airbag includes an exterior panel, an interior panel, and a curtain extension panel. The exterior panel and the interior panel cooperate to define the primary curtain portion, the interior panel and the curtain extension panel cooperate to define the secondary curtain portion, and the interior panel has at least one curtain airbag communication aperture extending therethrough for fluid communication between the primary curtain portion and the secondary curtain portion. The secondary driver airbag portion and the secondary curtain portion are positioned with respect to one another such that, when inflated, the secondary driver airbag portion and the secondary curtain portion are engageable with each other.

BRIEF DESCRIPTION OF THE DRAWINGS

The description herein makes reference to the accompanying drawings wherein like referenced numerals refer to like parts throughout the several views, and wherein.

DETAILED DESCRIPTION

Vehicle airbags are placed at locations within a vehicle that are adjacent to the vehicle occupants and are oriented relative to the vehicle occupants so as to maximize the likelihood that the vehicle occupant will contact the center of the airbag during deployment of the airbag in response to rapid deceleration of the vehicle. In some situations, however, the motion of the vehicle occupants during deployment of the airbag is such that the vehicle occupant does not come into contact with the center of the airbag but rather comes into contact with a peripheral part of the airbag. The disclosure herein relates in part to airbag assemblies where an airbag includes a secondary inflatable portion that is located near the periphery of a primary inflatable portion. The disclosure herein is also directed to airbag assemblies in which the secondary inflatable portion of a first airbag is engageable with a second airbag during deployment of the airbags.

Figure 1:
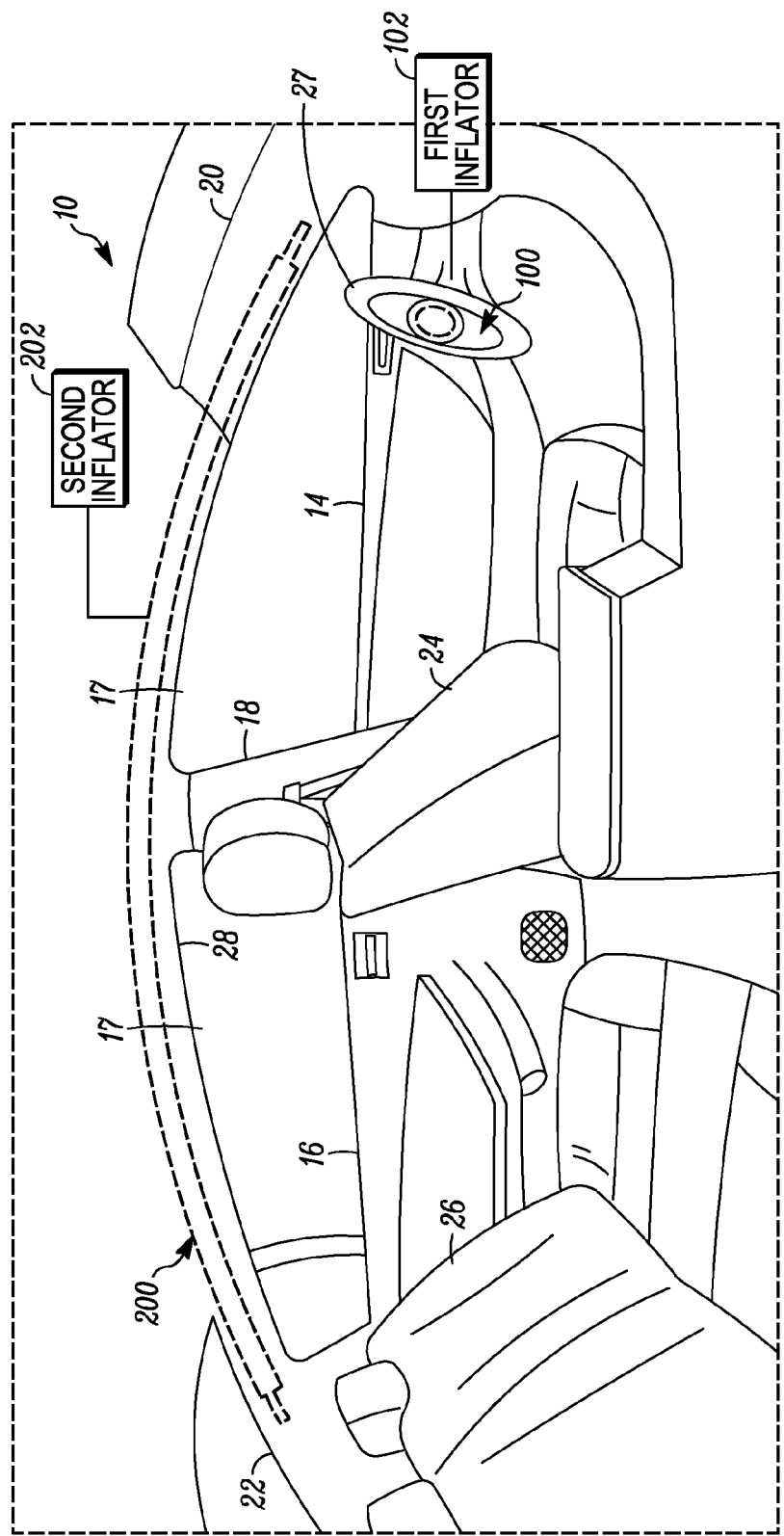
FIG. 1 is a side view of an interior of a vehicle equipped with a driver airbag assembly and a curtain airbag assembly.
Figure 2:
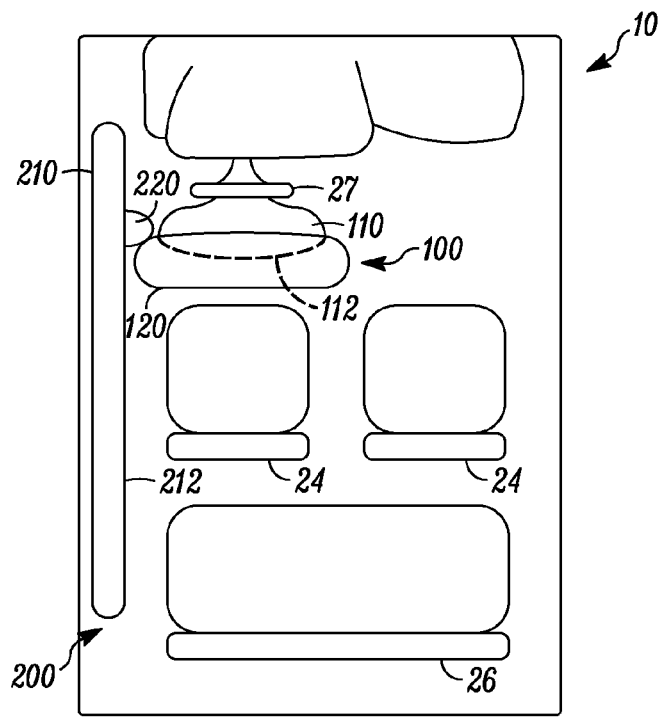
FIG. 2 is a top view of the interior of the vehicle during deployment of the driver airbag assembly and the curtain airbag assembly.
Figure 3:
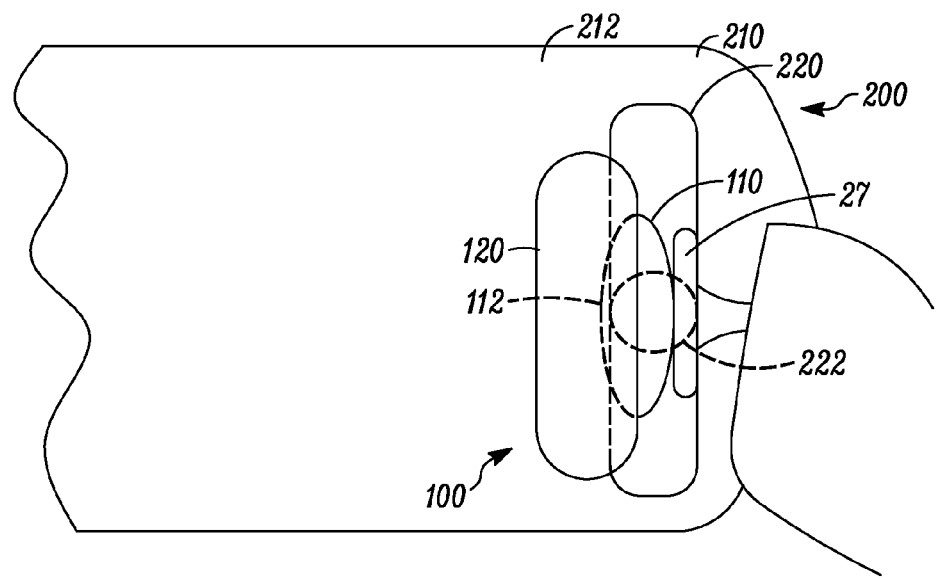
FIG. 3 is a side view of the interior of the vehicle during deployment of the driver airbag assembly and the curtain airbag assembly.

FIGS. 1-3 show a vehicle 10 having an impact restraint system that includes a driver airbag assembly 100 and a curtain airbag assembly 200. The vehicle 10 may include a front door 14 and a rear door 16, each of which including one or more windows 17. The front door 14 and the rear door 16 can be separated from one another by an interior structural pillar or B-pillar 18 of the vehicle 10. A front structural pillar or A-pillar 20 is disposed forward of the front door 14. A rear structural pillar or C-pillar 22 is disposed rearward of the rear door 16. The A-pillar 20, the B-pillar 18, and the C-pillar 22 can each be covered by trim panels. Front seats 24 are positioned adjacent to the front door 14, while rear seats 26 are positioned adjacent to the rear door 16. Of course, the driver airbag assembly 100 and the curtain airbag assembly 200 could be used with other vehicles, such as vehicles that do not include a rear door 16 but include rear seats 26, or vehicles that lack both a rear door 16 and rear seats 26.

The driver airbag assembly 100 and the curtain airbag assembly 200 are configured to be deployed upon rapid deceleration of the vehicle 10 (e.g., during an impact event or other contact between the vehicle 10 and an exterior obstacle) to restrain motion of the occupants of the vehicle 10 with respect to the vehicle 10 and to dissipate energy from the force of the impact. The vehicle 10 can include sensors, controllers, and associated hardware (not shown) that sense an impact event, determine whether to deploy the airbag assembly in response to the impact event, and cause deployment of the airbag assembly.

Prior to deployment, the driver airbag assembly 100 and the curtain airbag assembly 200 are disposed in a pre-deployment position (FIG. 1). In the pre-deployment position the driver airbag assembly 100 and the curtain airbag assembly 200 can be hidden from view within the interior vehicle 10. The airbags of the driver airbag assembly 100 and the curtain airbag assembly 200 can be folded, rolled, or otherwise compressed into a compact state when they are disposed in the pre-deployment position. For example, in the illustrated embodiment, the driver airbag assembly 100 is disposed within a steering wheel 27 of the vehicle 10 and the curtain airbag assembly 200 is disposed at least partially behind a headliner 28 of the vehicle 10 and extends underneath the headliner 28 along the longitudinal direction of the vehicle 10, just above the front door 14 and the rear door 16 as well as the B-pillar 18.

During deployment of the driver airbag assembly 100 and the curtain airbag assembly 200, a portion of each airbag assembly is inflated. Inflation causes at least part of each airbag assembly to enter the passenger compartment of vehicle 10. In order to inflate the driver airbag assembly 100 and the curtain airbag assembly 200, a first inflator 102 can be associated with the driver airbag assembly 100 for providing an inflation gas to an airbag of the driver airbag assembly 100, and a second inflator 202 can be associated with the curtain airbag assembly 200 for providing an inflation gas to an airbag of the curtain airbag assembly 200.

FIGS. 2-3 show the interior of the vehicle 10 during inflation of the driver airbag assembly 100 and the curtain airbag assembly 200, with the driver airbag assembly 100 and the curtain airbag assembly 200 in their inflated conditions. In particular, FIG. 2 is a top view showing the interior of the vehicle 10 during inflation of the driver airbag assembly 100 and the curtain airbag assembly 200, and FIG. 3 is a side view of the interior of the vehicle 10 during inflation of the driver airbag assembly 100 and the curtain airbag assembly 200.

The driver airbag assembly 100 includes an airbag that is defined by a primary driver airbag portion 110 and a secondary driver airbag portion 120. Herein, the primary driver airbag portion 110 may also be referred to as a primary inflatable portion of the driver airbag assembly 100, while the secondary driver airbag portion 120 may also be referred to as a secondary inflatable portion of the driver airbag assembly 100. When inflated, the secondary driver airbag portion 120 extends outward from an occupant-facing surface 112 of the primary driver airbag portion 110.

The curtain airbag assembly 200 includes a primary curtain portion 210 and a secondary curtain portion 220. Herein, the primary curtain portion 210 may also be referred to as a primary inflatable portion of the curtain airbag assembly 200. The secondary curtain portion 220 may also be referred to as a secondary inflatable portion of the curtain airbag assembly 200. The primary curtain portion 210 defines an occupant-facing surface 212. When inflated, the secondary curtain portion 220 extends outward from the occupant-facing surface 212 of the primary curtain portion 210 of the curtain airbag assembly 200.

The secondary curtain portion 220 of the curtain airbag assembly 200 is positioned with respect to the secondary driver airbag portion 120 of the driver airbag assembly 100 to allow interaction of the secondary curtain portion 220 and the secondary driver airbag portion 120 during inflation of the driver airbag assembly 100 and the curtain airbag assembly 200. In particular, when the driver airbag assembly 100 and the curtain airbag assembly 200 are inflated, the relative position of the driver airbag assembly 100 with respect to the curtain airbag assembly 200 allows the secondary driver airbag portion 120 to come into engagement with the secondary curtain portion 220 of the curtain airbag assembly 200. Thus, the distance by which the secondary curtain portion 220 extends outward from the occupant-facing surface 212 over the primary curtain portion 210 is sufficient to allow at least a portion of the secondary curtain portion 220 to contact at least a portion of the driver airbag assembly 100. For instance, the distance by which the secondary curtain portion 220 extends outward from the occupant-facing surface 212 of the curtain airbag assembly 200 can be equal to or greater than the distance between the occupant-facing surface 212 of the primary curtain portion 210 of the curtain airbag assembly 200 and the secondary driver airbag portion 120 of the driver airbag assembly 100, in some implementations.

In some implementations, the secondary curtain portion 220 is engageable with the secondary driver airbag portion 120 opposite the occupant-facing surface 112 of the primary driver airbag portion 110 of the driver airbag assembly 100. In this implementation, the secondary curtain portion 220 can be positioned longitudinally forward with respect to the secondary driver airbag portion 120, where longitudinally forward is defined as being closer to the front of the vehicle in a front-to-rear direction of the vehicle. In other examples, the secondary curtain portion 220 can be positioned longitudinally rearward with respect to the secondary driver airbag portion 120, where longitudinally rearward is defined as being further away from the front of the vehicle 10 in a front-to-rear direction of the vehicle. In either of these examples, the secondary curtain portion 220 can also be positioned laterally adjacent to the secondary driver airbag portion 120 of the driver airbag assembly 100.

As shown in the illustrated example in FIG. 3, the secondary curtain portion 220 can be relatively short in the front-to-rear direction of the vehicle as compared to the overall length of the curtain airbag assembly 200. In the illustrated example, the secondary curtain portion 220 has a height that is less than the overall height of the primary curtain portion 210 of the curtain airbag assembly 200 and is taller than the height of the secondary driver airbag portion 120 of the driver airbag assembly 100. It should be understood, however, that the secondary curtain portion 220 of the curtain airbag assembly 200 need not be taller than the secondary driver airbag portion 120 of the driver airbag assembly 100. For instance, an alternative implementation of a secondary curtain portion 222 (shown in FIG. 3) can be substantially cylindrical.

Figure 4:
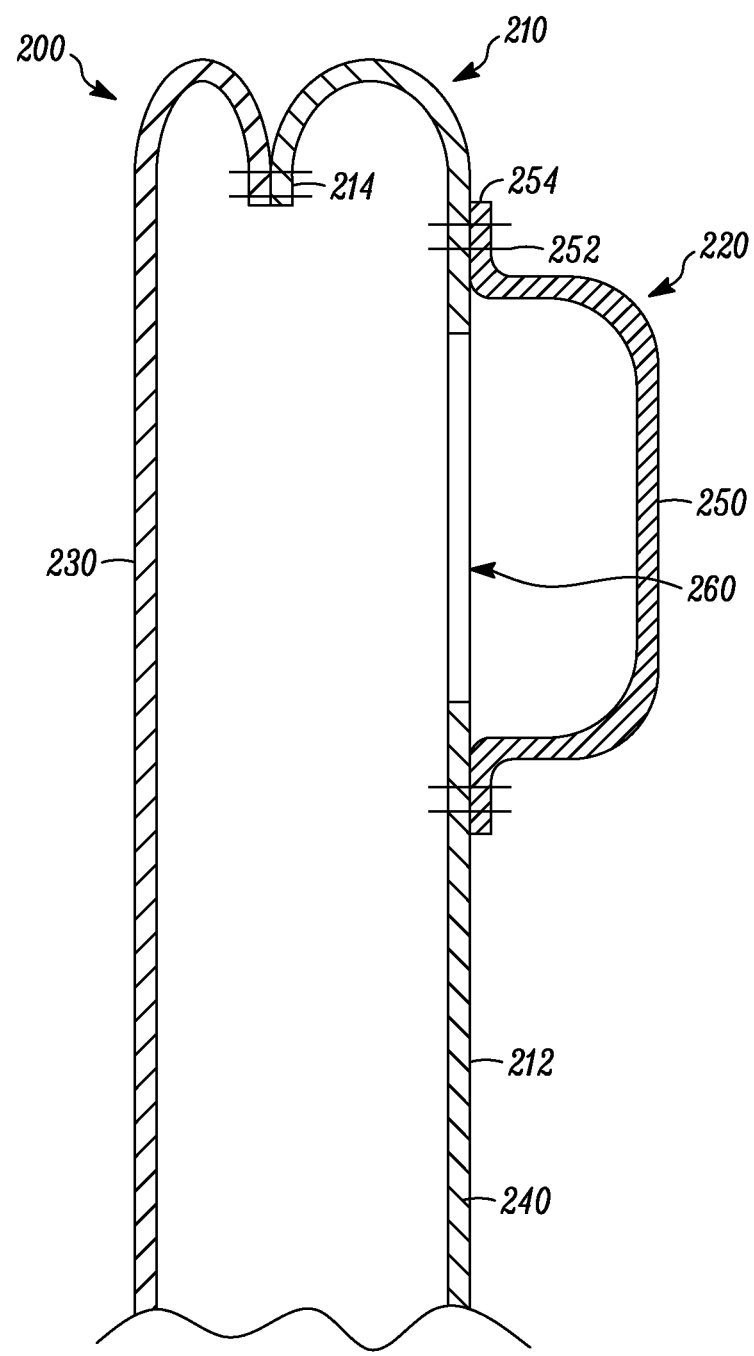
FIG. 4 is a top cross-section view showing the curtain airbag assembly during deployment of the curtain airbag assembly.

FIG. 4 is a cross-section view of the curtain airbag assembly 200 showing the primary curtain portion 210 and the secondary curtain portion 220. The curtain airbag assembly 200 includes an exterior panel 230 and an interior panel 240. When the curtain airbag assembly 200 is inflated, the exterior panel 230 is oriented toward the exterior of the vehicle. When the curtain airbag assembly 200 is inflated, the interior panel 240 is oriented toward the interior of the vehicle 10. The exterior panel 230 and the interior panel 240 are connected to one another at a peripheral seam 214 and cooperate to define the primary curtain portion 210 of the curtain airbag assembly 200. In addition, the occupant-facing surface 212 of the primary curtain portion 210 is formed on the interior panel 240.

The curtain airbag assembly 200 also includes a curtain extension panel 250. The curtain extension panel 250 is connected to the interior panel 240 at a seam 252 that extends continuously around a periphery 254 of the curtain extension panel 250. The secondary curtain portion 220 is defined by cooperation of the interior panel 240 with the curtain extension panel 250, thereby defining an inflatable interior space for the secondary curtain portion 220 between the interior panel 240 and the curtain extension panel 250. In order to allow inflation gas to enter the secondary curtain portion 220, at least one communication aperture, such as a communication aperture 260, extends through the interior panel to allow fluid communication between the interior of the primary curtain portion 210 and the secondary curtain portion 220. Thus, during inflation, the inflation gas enters the curtain airbag assembly 200 from the second inflator 202 (FIG. 1) by first entering the primary curtain portion 210 and then entering the secondary curtain portion 220 from the primary curtain portion 210 through the communication aperture 260.

Figure 5:
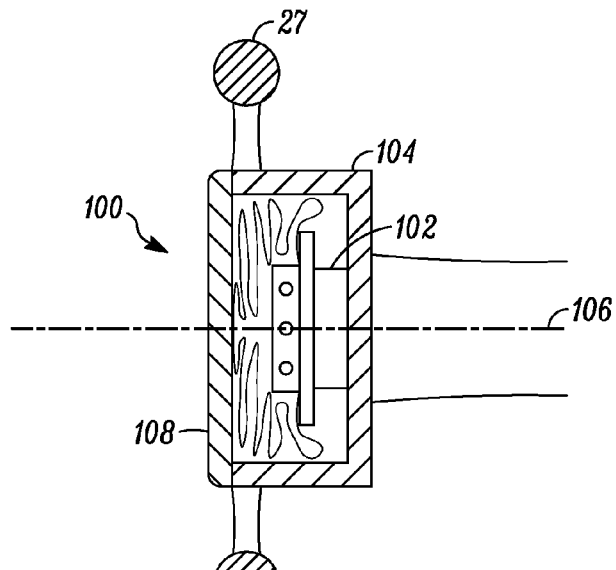
FIG. 5 is a side cross-section view showing the driver airbag assembly prior to deployment of the driver airbag assembly.

FIG. 5 is a cross-sectional view of the steering wheel 27 showing the driver airbag assembly 100 in a pre-deployment condition. Prior to deployment, the driver airbag assembly 100 is deflated with the primary driver airbag portion 110 and the secondary driver airbag portion 120 folded and disposed within a driver airbag housing 104, which is a portion of the steering wheel 27 and is arranged around a central axis, which is the axis around which the primary driver airbag portion 110 is arranged, and the axis along which the primary driver airbag portion 110 inflates during inflation of the driver airbag assembly 100. The first inflator 102 can, in some implementations, be disposed within the driver airbag housing 104. The driver airbag housing 104 can be closed by a panel 108 that is configured to open, break, separate, or otherwise expose the primary driver airbag portion 110 and the secondary driver airbag portion 120 to the interior of the vehicle during inflation of the driver airbag assembly 100.

Figure 6:
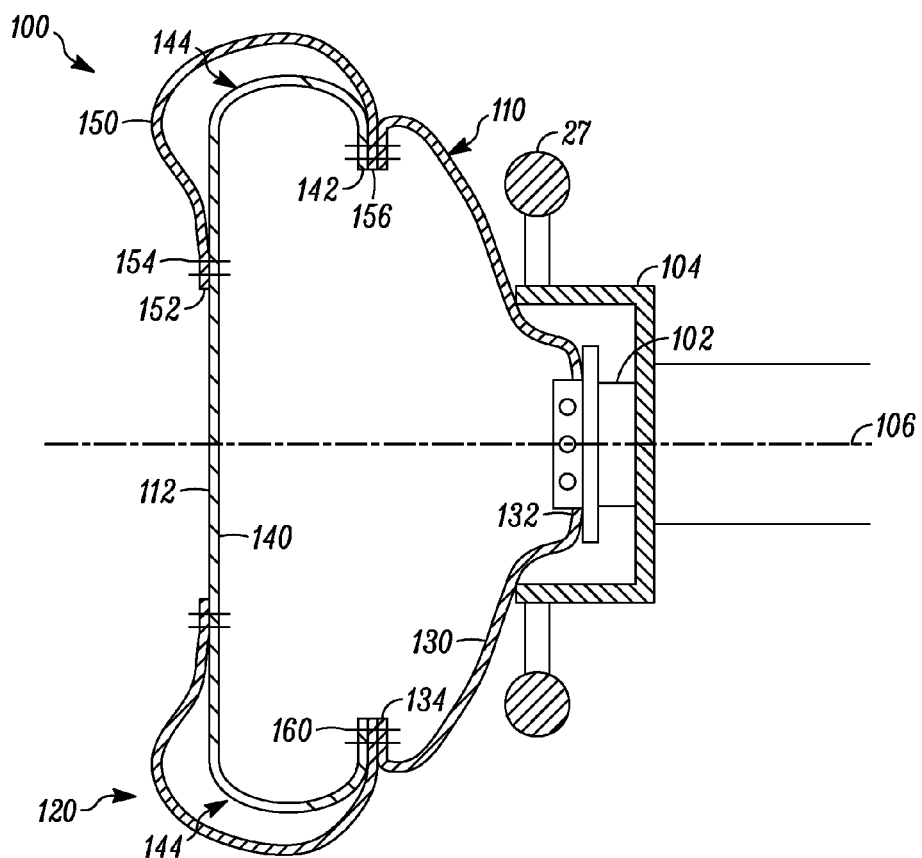
FIG. 6 is a side cross-section view showing the driver airbag assembly during deployment of the driver airbag assembly.

FIG. 6 is a cross-sectional view showing the steering wheel 27 and the driver airbag assembly 100 in the inflated condition, subsequent to deployment of the driver airbag assembly 100. The driver airbag assembly 100 can include a rear panel 130, a front panel 140, and an extension panel 150. When the inflation gas is received from the first inflator 102 during inflation of the driver airbag assembly 100, the rear panel 130 and the front panel 140 cooperate to define the primary driver airbag portion 110, while the front panel 140 and the extension panel 150 cooperate to define the secondary driver airbag portion 120.

The rear panel 130 can be a substantially circular member having an inflation aperture 132 that is located centrally on the rear panel 130 for receiving the inflation gas from the first inflator 102. The rear panel 130 also includes an outer periphery 134, which can be substantially circular in shape. The rear panel 130 can be joined to the front panel 140 and the extension panel 150 at a seam 160. The seam 160 can have three layers, one for each of the rear panel 130, the front panel 140, and the extension panel 150, that are joined in any suitable manner, such as by sewing or by adhesives. In one implementation, a portion of the extension panel 150 can be interposed between the rear panel 130 and the front panel 140 at the seam 160.

The front panel 140 can be a substantially circular panel having an outer periphery 142 that is located adjacent to the seam 160. One or more communication apertures 144 can extend through the front panel 140 to allow fluid communication of the inflation gas from the interior of the primary driver airbag portion 110 to the interior of the secondary driver airbag portion 120.

The extension panel 150 is arcuate in shape and is located adjacent to the periphery of the primary driver airbag portion 110 which is defined adjacent to the seam 160 where the rear panel 130 and the front panel 140 meet. In some examples, the extension panel 150 is substantially toroidal, while in other examples, the extension panel 150 defines an arc with a first end and a second end, as will be explained further herein. The extension panel 150 has an inner edge 152 that is connected to the front panel 140 at an inner seam 154. The inner seam 154 is offset from the central axis 106. The extension panel 150 also has an outer edge 156, which can be a peripheral edge of the extension panel 150. The outer edge 156 of the front panel 140 can be located adjacent to the seam 160, where the extension panel 150 is connected to the front panel 140 and the rear panel 130.

When the driver airbag assembly 100 is inflated, the inflation gas flows into the primary driver airbag portion 110 via the inflation aperture 132. The primary driver airbag portion 110 is defined by the rear panel 130 and the front panel 140. The inflation gas travels from the interior of the primary driver airbag portion 110 into the interior of the secondary driver airbag portion 120 via the communication apertures 144. The secondary driver airbag portion 120 is defined by the front panel 140 in cooperation with the extension panel 150. When inflated by the inflation gas, the secondary driver airbag portion 120 extends outward with respect to the front panel 140 of the driver airbag assembly 100 toward a vehicle occupant. In addition, when inflated, at least a portion of the secondary driver airbag portion 120 is positioned closer to the vehicle occupant than the occupant-facing surface 112 of the primary driver airbag portion 110. In some implementations, when inflated, at least a portion of the secondary driver airbag portion 120 is positioned radially outward from the seam 160 with respect to the central axis 106.

Figure 7A:
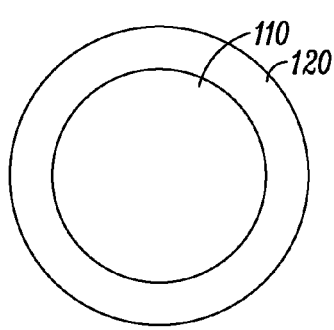
FIG. 7A is a first example configuration for a secondary inflatable portion of the driver airbag assembly.
Figure 7B:
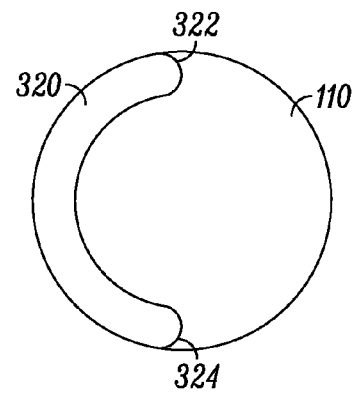
FIG. 7B is a second example configuration for the secondary inflatable portion of the driver airbag assembly.
Figure 7C:
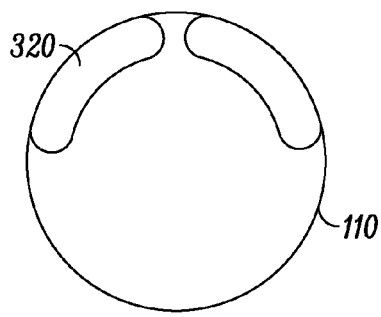
FIG. 7C is a third example configuration for the secondary inflatable portion of the driver airbag assembly.
Figure 7D:
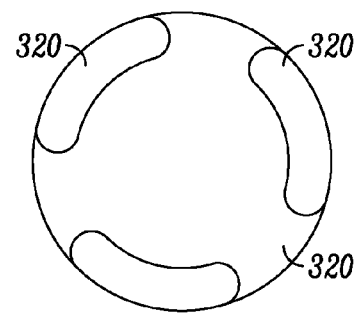
FIG. 7D is a fourth example configuration for the secondary inflatable portion of the driver airbag assembly.
Figure 7E:
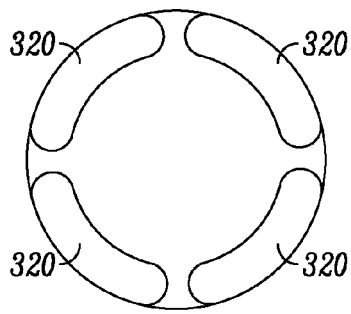
FIG. 7E is a fifth example configuration for the secondary inflatable portion of the driver airbag assembly.

As shown in FIGS. 7A-7E, multiple configurations can be adopted for the secondary driver airbag portion 120 of the driver airbag assembly 100. As shown in FIG. 7A, the secondary driver airbag portion 120 can be substantially toroidal and extend continuously around the periphery of the primary driver airbag portion 110. As shown in FIG. 7B, an alternate secondary driver airbag portion 320 can extend from a first end 322 to a second end 324 along the outer periphery of the primary driver airbag portion 110. In FIG. 7B, the alternate secondary driver airbag portion 320 extends along an arc of approximately a half circle with respect to the periphery of the primary driver airbag portion 110. FIGS. 7C, 7D, and 7E are examples in which multiple instances of the alternate secondary driver airbag portion 320 are provided, where each extends along a portion of the periphery of the primary driver airbag portion 110. As shown in these examples, the alternative secondary driver airbag portion 320 can be provided in multiple configurations that include secondary inflatable portions that are spaced apart from one another and are provided in any desired number.

In some examples, the primary driver airbag portion 110 of the driver airbag assembly 100, when inflated, is wider than the steering wheel 27. In addition, this secondary driver airbag portion 120, when inflated, can be wider than the primary driver airbag portion 110 of the driver airbag assembly 100.

In operation, the airbag assemblies described herein are deployed by inflating at least a portion of the airbag panel of the airbag assembly.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle comprising:
   a driver airbag having a primary driver airbag portion that defines an occupant-facing surface and a secondary driver airbag portion that, when inflated, extends outward from the occupant-facing surface of the primary driver airbag portion; and
   a curtain airbag having a primary curtain portion that defines an occupant-facing surface and a secondary curtain portion that, when inflated, extends outward from the occupant-facing surface of the primary curtain portion, wherein the secondary driver airbag portion and the secondary curtain portion are positioned with respect to one another such that, when inflated, the secondary driver airbag portion and the secondary curtain portion are engageable with each other, the secondary curtain portion is positioned longitudinally forward with respect to the secondary driver airbag portion such that the secondary curtain portion is between the secondary driver airbag portion and a front end of the vehicle, and the secondary curtain portion is taller than the secondary driver airbag portion.

2. The vehicle of claim 1, wherein, when inflated, the secondary curtain portion is positioned laterally adjacent to the secondary driver airbag portion.

3. The vehicle of claim 1, wherein, when inflated, the secondary curtain portion is substantially cylindrical.

4. The vehicle of claim 1, wherein the curtain airbag includes at least one communication aperture between the primary curtain portion and the secondary curtain portion, wherein during inflation, an inflation gas enters the secondary curtain portion from the primary curtain portion through the at least one communication aperture of the curtain airbag.

5. The vehicle of claim 4, wherein the curtain airbag includes an exterior panel, an interior panel, and a curtain extension panel, wherein the exterior panel and the interior panel cooperate to define the primary curtain portion, the interior panel and the curtain extension panel cooperate to define the secondary curtain portion, and the at least one communication aperture of the curtain airbag extends through the interior panel.

6. The vehicle of claim 1, further comprising:
   a first inflator associated with the driver airbag for inflating the driver airbag; and
   a second inflator associated with the curtain airbag for inflating the curtain airbag.

7. A vehicle comprising:
   a driver airbag having a primary driver airbag portion that defines an occupant-facing surface and a secondary driver airbag portion that, when inflated, extends outward from the occupant-facing surface of the primary driver airbag portion, wherein the driver airbag includes at least one communication aperture between the primary driver airbag portion and the secondary driver airbag portion, wherein during inflation, an inflation gas enters the secondary driver airbag portion from the primary driver airbag portion through the at least one communication aperture of the driver airbag; and
   a curtain airbag having a primary curtain portion that defines an occupant-facing surface and a secondary curtain portion that, when inflated, extends outward from the occupant-facing surface of the primary curtain portion, wherein the secondary driver airbag portion and the secondary curtain portion are positioned with respect to one another such that, when inflated, the secondary driver airbag portion and the secondary curtain portion are engageable with each other.

8. The vehicle of claim 7, wherein the driver airbag includes a rear panel, a front panel, and a driver airbag extension panel, wherein the rear panel and the front panel cooperate to define the primary driver airbag portion, the front panel and the driver airbag extension panel cooperate to define the secondary driver airbag portion, and the at least one communication aperture of the driver airbag extends through the front panel.

9. A vehicle comprising:
   a driver airbag having a primary driver airbag portion that defines an occupant-facing surface and a secondary driver airbag portion that, when inflated, extends outward from the occupant-facing surface of the primary driver airbag portion, the driver airbag including a rear panel, a front panel, and a driver airbag extension panel, wherein the rear panel and the front panel cooperate to define the primary driver airbag portion, the front panel and the driver airbag extension panel cooperate to define the secondary driver airbag portion, and the front panel having at least one driver airbag communication aperture extending therethrough for fluid communication between the primary driver airbag portion and the secondary driver airbag portion; and a curtain airbag having a primary curtain portion that defines an occupant-facing surface and a secondary curtain portion that, when inflated, extends outward from the occupant-facing surface of the primary curtain portion, the curtain airbag including an exterior panel, an interior panel, and a curtain extension panel, wherein the exterior panel and the interior panel cooperate to define the primary curtain portion, the interior panel and the curtain extension panel cooperate to define the secondary curtain portion, and the interior panel having at least one curtain airbag communication aperture extending therethrough for fluid communication between the primary curtain portion and the secondary curtain portion, wherein the secondary driver airbag portion and the secondary curtain portion are positioned with respect to one another such that, when inflated, the secondary driver airbag portion and the secondary curtain portion are engageable with each other.

10. The vehicle of claim 9, wherein, when inflated, the secondary curtain portion is positioned laterally adjacent to the secondary driver airbag portion.

11. The vehicle of claim 9, wherein, when inflated, the secondary curtain portion is positioned longitudinally forward with respect to the secondary driver airbag portion.

12. The vehicle of claim 9, wherein, when inflated, the secondary curtain portion is positioned longitudinally rearward with respect to the secondary driver airbag portion.

13. The vehicle of claim 9, wherein, when inflated, the secondary curtain portion is taller than the secondary driver airbag portion.

14. The vehicle of claim 9, wherein, when inflated, the secondary curtain portion is substantially cylindrical.

15. The vehicle of claim 9, further comprising:
a first inflator associated with the driver airbag for inflating the driver airbag; and
a second inflator associated with the curtain airbag for inflating the curtain airbag.

16. A vehicle comprising:
a vehicle body;
a steering wheel connected to the vehicle body;
a driver airbag connected to the steering wheel, the driver airbag having a primary driver airbag portion that defines an occupant-facing surface and a secondary driver airbag portion that, when inflated, extends outward from the occupant-facing surface of the primary driver airbag portion, the driver airbag including a rear panel, a front panel, and a driver airbag extension panel, wherein the rear panel and the front panel cooperate to define the primary driver airbag portion, the front panel and the driver airbag extension panel cooperate to define the secondary driver airbag portion, and the front panel having at least one driver airbag communication aperture extending therethrough for fluid communication between the primary driver airbag portion and the secondary driver airbag portion;
a first inflator associated with the driver airbag for inflating the driver airbag;
a curtain airbag connected to the vehicle body, the curtain airbag having a primary curtain portion that defines an occupant-facing surface and a secondary curtain portion that, when inflated, extends outward from the occupant-facing surface of the primary curtain portion, the curtain airbag including an exterior panel, an interior panel, and a curtain extension panel, wherein the exterior panel and the interior panel cooperate to define the primary curtain portion, the interior panel and the curtain extension panel cooperate to define the secondary curtain portion, and the interior panel having at least one curtain airbag communication aperture extending therethrough for fluid communication between the primary curtain portion and the secondary curtain portion, wherein the secondary driver airbag portion and the secondary curtain portion are positioned with respect to one another such that, when inflated, the secondary driver airbag portion and the secondary curtain portion are engageable with each other; and
a second inflator associated with the curtain airbag for inflating the curtain airbag.

17. The vehicle of claim 16, wherein, when inflated, the secondary curtain portion is positioned longitudinally forward with respect to the secondary driver airbag portion.

* * * * *